United States Patent [19]

Warehime

[11] 4,352,255
[45] Oct. 5, 1982

[54] GROUP USE TOY STRUCTURAL CONSTRUCTION SET

[76] Inventor: Norwood R. Warehime, 704 W. 34th St., Baltimore, Md. 21211

[21] Appl. No.: 212,832

[22] Filed: Dec. 4, 1980

[51] Int. Cl.³ ............................................ A63H 33/10
[52] U.S. Cl. ......................................... 46/16; 52/646; 46/29; 403/234
[58] Field of Search ...................... 403/391; 46/29, 16, 46/28, 26, 27; 52/646, 645, 648, 637; 272/113

[56] References Cited

U.S. PATENT DOCUMENTS

| | | | |
|---|---|---|---|
| 1,095,858 | 5/1914 | Harrison | 46/28 |
| 1,688,074 | 10/1928 | Goff | 52/646 |
| 1,901,964 | 3/1933 | Haskell | 272/113 |
| 1,929,822 | 10/1933 | Patterson | 272/113 |
| 2,170,771 | 8/1939 | Benjamin | 46/26 X |
| 2,648,539 | 8/1953 | Packer | 52/648 |
| 2,900,496 | 8/1959 | Williams | 46/29 X |
| 2,959,888 | 11/1960 | Noble | 46/28 |
| 3,115,340 | 12/1963 | Stasiuk | 273/1 |
| 3,221,439 | 12/1965 | Schaper | 46/29 |
| 3,333,349 | 8/1967 | Brumlik | 46/29 X |
| 3,386,590 | 6/1968 | Gretz | 403/391 X |
| 3,392,480 | 7/1968 | Stubbmann | 46/25 |
| 3,550,311 | 12/1970 | Fouquart | 46/28 |
| 3,698,123 | 10/1972 | Heldt | 46/29 |
| 3,927,489 | 12/1975 | Bernstein | 46/29 |

FOREIGN PATENT DOCUMENTS

| | | | |
|---|---|---|---|
| 143801 | 10/1951 | Australia | 46/16 |
| 826115 | 12/1951 | Fed. Rep. of Germany | 46/29 |
| 2720641 | 11/1977 | Fed. Rep. of Germany | 46/28 |
| 21097 | 5/1946 | Finland | 46/26 |
| 618871 | 3/1961 | Italy | 46/29 |
| 13224 | of 1897 | United Kingdom | 46/29 |
| 183390 | 7/1922 | United Kingdom | 46/29 |
| 669495 | 4/1952 | United Kingdom | 46/29 |

Primary Examiner—F. Barry Shay

[57] ABSTRACT

A group use toy structural construction set comprising various lengths of a straight resilient plastic tubes with slotted ends, large size tubular member resilient plastic hoops, three basic types of tubular member connectors, and an optional wheel hub. The three basic types of connectors are used for releasable interengagement of: (a) tubular member body-to-tube end; (b) tubular member body-to-tubular member body; and (c) tube end-to-tube end. Connectors use identical clutching elements and identical frictional fitted plugs, with clutching elements designed to grasp and frictionally hold tubular member bodies, and plugs designed to be fitted into slotted tube ends and frictionally hold therein. Tubes and hoops have same outside diameter for tubular bodies. Hoops have overall diameters ranging up to those of a "hula" hoop, or about 36 in. (90 cms). Some connectors are fixed type, and some pivotal type, with latter having angular latitude advantage over former. Optional wheel hub element for set permits assembly of mobile structures. Relatively large stationary and mobile structures can be assembled by groups up to 25 persons, indoors or outdoors, with size of structures measuring up to 4 yds (4 mts) high and 6 yds (6 mts) long. Set elements are simple, safe, lightweight, easy to use, and require no tools for assembly. Tubes and hoops are standard trade items and are readily available. Connectors are strong, durable, versatile, and can be made essentially of resilient plastic. Construction set with assemblies has high educational and entertainment value, and can be a valuable medium for encouragement of cooperative thought and work efforts when used by large groups. A booklet in schematic and photographic form showing various possible structures that can be assembled is to accompany set.

6 Claims, 25 Drawing Figures

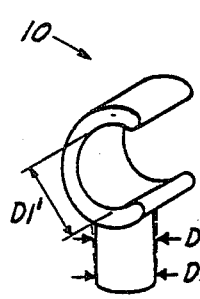
FIG.1A
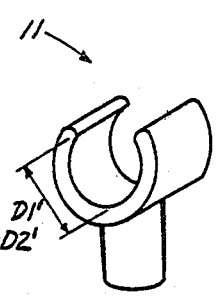
FIG.1B
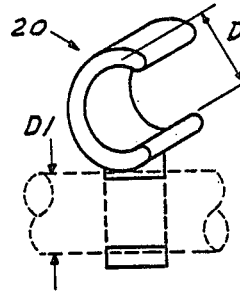
FIG.2A
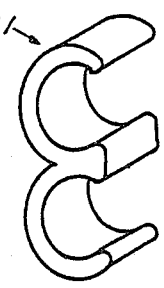
FIG.2B
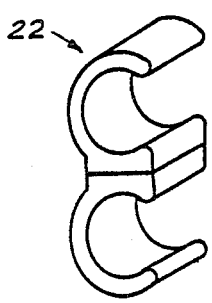
FIG.2C
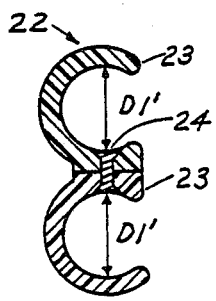
FIG.2S
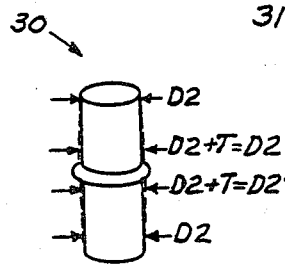
FIG.3A
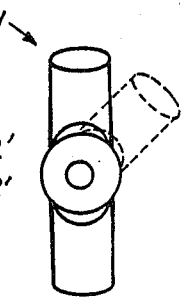
FIG.3B
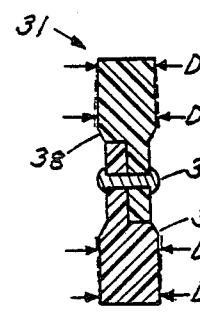
FIG.3S
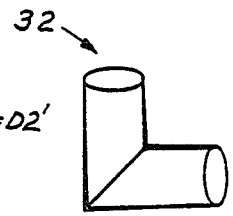
FIG.3C
FIG.3D
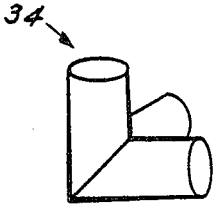
FIG.3E
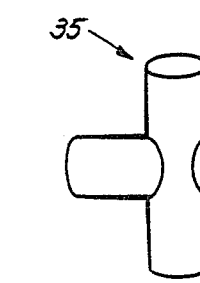
FIG.3F
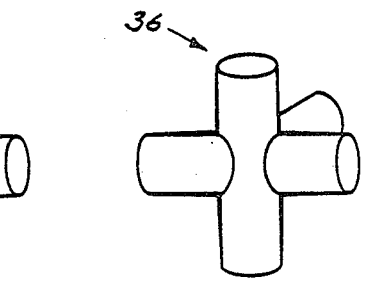
FIG.3G
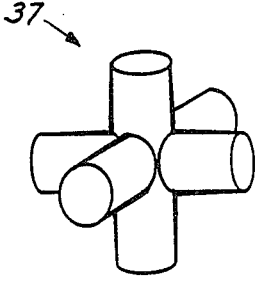
FIG.3H

GROUP USE TOY STRUCTURAL CONSTRUCTION SET

TECHNICAL FIELD

The invention relates to a group use toy structural construction set; various lengths of straight tubes and relatively large diameter hoops of resilient plastic are used in conjunction with various friction fitted and releasably interengageable connectors to construct a wide range of relatively large size stationary and mobile structures.

BACKGROUND ART

Prior art discloses many types of construction sets using friction fitted and releasably interengageable elements, straight tube and rod elements, ring and hoop members, and various optional members such as wheels, hubs, pulleys, plates, and figures. U.S. Pat. No. 3,927,489 discloses set using tubes or plates with channels, friction fitted connector stems with receptive slots, and small connector rings; U.S. Pat. No. 3,698,123 discloses set using slotted rods, extension and locking tubes, rings, and wheels; U.S. Pat. No. 3,550,311 discloses set using rod and tube elements with clutching claws at ends, with claws so designed to frictionally hold rod or tube body, or for claws to interlock with each other; U.S. Pat. No. 3,392,480 discloses set featuring a family of resilient toy figurines with arms and legs terminating in coupling members which permit figurines to interengage with each other or to permit them to grasp and hold mating sized rods and rings; U.S. Pat. No. 3,221,439 discloses a specific resilient double clutching connector element for use in frictionally holding small rods or toy logs in assemblies; U.S. Pat. No. 3,115,340 discloses set of relatively large size metal rings or hoops which are frictionally interengaged to form a game play area layout; U.S. Pat. No. 2,959,888 discloses toy figures and elongated "sticks" or links which are arranged to be interlocked with each other in desired configurations.

Prior art of many of U.S. patents cited feature element types with limited assembly applications, and many feature certain elements which can only be used for abstract type assemblies. Except for the one patent which features hoop elements intended for limited game area layout application, use of such relatively large size rings or hoops is generally lacking or not obvious in assembly considerations. In addition, a simple connector element for interengagement of tubular or rod bodies of two hoops, two straight tubes or rods, or a hoop and a tube or rod is generally overlooked. Furthermore, in general, most construction set elements are intended for or limited to relatively small scale assemblies by individuals and are not suitable for group use.

It must be stated that many other types of documented and undocumented frictionally fitted and releasably interengageable elements and construction sets must be considered as prior art, but differences between this group and those of subject invention will become obvious in subsequent disclosure details.

DISCLOSURE OF INVENTION

The invention as claimed is intended to provide a simple, practical, and versatile toy construction set consisting of straight tubes, large diameter tubular hoops, and three basic types of tubular member friction fitted connectors which can be used to construct a wide range of relatively large size stationary and mobile structures. The novel construction set is primarily intended for educational and entertainment purposes by youth groups such as entire school classes, large parks and recreational groups, and certain special need groups. The invention solves the problem of how to design a compatible set of three basic types of friction fitted connectors that can be used to releaseably interengage straight and hoop type tubular members. The three basic types of connectors are: (a) a tubular member body-to-tube end connector having a clutch/plug arrangement; (b) a tubular member body-to-tubular member body connector having a double clutch arrangement; and a tube end-to-tube end connector having a multi-plug arrangement. The invention covers design of both fixed and pivotal type connectors and an optional wheel hub element.

The advantages offered by the invention are mainly: (a) minimal number of diferent types of construction elements are required; (b) all construction elements are simple, safe, lightweight, inexpensive, and easy to use and require no tools in assemblies; (c) resilient plastic tubes and hoops are standard trade items and are readily available in a variety of sizes and colors; (d) friction fitted type connectors are strong, durable, versatile, and can be made essentially of resilient plastic; (e) construction set using large diameter "hula" hoops can be used safely and easily to assemble large size stationary and mobile structures measuring up to 4 yds. (4 mts) high and 6 yds. (6 mts) long; (f) set can be used by a large group of persons at one time, with small groups making subassemblies which can be joined together to form large final structure; (g) construction set with assemblies has high educational and entertainment value, and can be a valuable medium for encouragement of cooperative thought and work efforts when used by large groups.

BRIEF DESCRIPTION OF DRAWINGS AND TABLE OF REFERENCE SIGNS

The invention is described in detail with reference to drawings and table of reference signs which illustrate several embodiments, in which FIGS. 1A and 1B are perspective views of two types of tube or hoop body-to tube end connectors;

FIGS. 2A, 2B, and 2C are three types of tube or hoop body-to-tube or hoop body connectors;

FIG. 2S is a longitudinal section view through center of connector in FIG. 2C;

FIGS. 3A, 3B, 3C, 3D, 3E, 3F, 3G, and 3H are perspective views of eight different types of tube end-to-tube end connectors;

FIG. 3S is a longitudinal section view through center of connector in FIG. 3B;

Table 1 lists reference signs for construction elements used in schematic examples of construction set assemblies shown in FIGS. 9 through 12.

DESCRIPTION AND PREFERRED EMBODIMENTS FOR CARRYING OUT INVENTION

FIGS. 1A and 1B show clutch/plug connectors indicated by 10 and 11 respectively, which are used for releasable interengagement or joining of a tube end to a tube or hoop body. Resilient plastic clutching elements of connectors 10 and 11 each have a pair of resilient claws forming a cylindrical opening with a diameter indicated by D1' which is slightly less than that of a tubular member body outside diameter of hoop or tube indicated by D1 in FIGS. 4 and 5.

Figure 5:
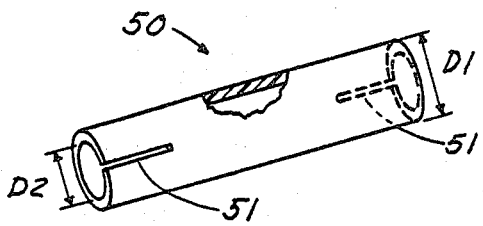
FIG. 5 is a perspective view of a straight tube with small sectional cut view and with view of slotted tube ends.

Restricted passageway formed by end portions of connector claws has a slightly smaller width opening measurement than D1', whereby a tubular member body can be snapped laterally through restricted passageway and into cylindrical opening where claws of clutching element can grasp and frictionally hold the tubular member body securely. The plug portions each comprising half of connectors 10 and 11 are circular in cross-section and tapered to frictionally fit into a slotted tube end having an inside diameter of D2 as shown in FIG. 5. End portions of plugs each has a diameter of D2, and portions of plugs abutting clutching elements each has an enlarged diameter by increment of "T" or a diameter of D2' which will insure a secure frictional fit of plug portions of connectors 10 and 11 into a slotted tube end. The only difference between connector types 10 and 11 is that former has restricted passageway on side of connector, displaced 90° from plug, while latter has restricted passageway on far end of connector from plug and is displaced 180° from plug. Most suitable material for fabrication of clutch/plug connectors is resilient plastic but spring type metal bands with plastic or metal plugs could be used with equivalent results.

Figure 4:
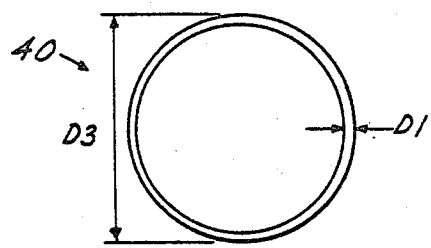
FIG. 4 is a plan view of tubular member hoop.

FIGS. 2A, 2B, and 2C show double clutch connectors indicated by 20, 21, and 22 respectively, which are used for releasable interengagement or joining of any combination of two tubular member bodies of straight tubes or circular hoops which have same outside diameter of D1 as shown in FIGS. 4 and 5. All three types of double clutch connectors each have two pairs of resilient plastic clutching elements, each clutching element being the same as previously described for clutching portion of clutch/plug connectors 10 and 11. Double clutch connector type 22 as shown in FIG. 2C is the basic type connector in this family and is pivotal in construction, permitting each of two separate clutching elements to be rotated around a rivet which connects them. FIG. 2S is a longitudinal section view of connector 22 through rivet 24 which connects the two separate clutching elements 23. Double clutch connectors 20 and 21 are fixed types, with both having restricted passageways on sides of connectors, but connector 20 has a 90° displacement between longitudinal axis of its cylindrical openings, and connector 21 has no displacement of such. Most suitable material for fabrication of double clutch connectors is resilient plastic but spring type metal bands could be used with equivalent results.

FIGS. 3A, 3B, 3C, 3D, 3E, 3F, 3G, and 3H show a family of eight different types of multi-plug connectors indicated by numbers 30 through 37 respectively, which are used for releasable interengagement or joining of a plurality of tube ends at a common junction point. All plugs of the multi-plug connectors are identical, having a body circular in cross-section and tapering to frictionally fit into a slotted rube end having an inside diameter of D2 as shown for tube 50 in FIG. 5. End portions of plugs have a diameter of D2, and portions of plugs adjacent to common junction point of connectors have an enlarged diameter by increment of "T" or a diameter of D2' which will insure a secure frictional fit of plugs into slotted tube ends. Multi-plug connector type 31 as shown in FIG. 3B is the basic type connector in this family, has 2 plugs, and is pivotal in construction, permitting the two plugs to be rotated around a rivet fastener 39 which connects the centers of disc lug portions of the two plug bodies 38. FIG. 3S is a longitudinal section view of pivotal two plug connector 31 with section line through rivet 39 which connects the two plug bodies 38. All other multi-plug connectors in this family are of fixed construction, and number of plugs for various family types ranges from two to six inclusive, with plugs having various systematic 90° and 180° angular spacing therebetween to form the family types as follows: a "straight run" type 30 as in FIG. 2A, having two plugs; an "ell" type 32 as in FIG. 3C, having two plugs; a "tee" type 33 as in FIG. 3D, having three plugs; an "ell with lateral" type 34 as in FIG. 3E, having three plugs; a "cross" type 35 as in FIG. 3F, having four plugs; a "cross with lateral" type 36 as in FIG. 3G, having five plugs; and a "cross with two laterals" type 37 as in FIG. 3H, having six plugs. Most suitable material for fabrication of multi-plug connectors is resilient plastic but other materials of a rigid nature including metal could be used with equivalent results.

FIG. 4 shows tubular member hoop 40 with a tubular member outside diameter indicated by D1, and an overall hoop diameter indicated by D3. FIG. 5 shows straight tube 50 with saw-cut type slot 51 at each end. Outside diameter of tube is indicated by D1, and inside diameter of D2. Both tubular member of hoop 40 and tube 50 have the same outside diameter D1, which in actuality is about ¾ inches or about 2.0 cms. Actual overall hoop diameter D3 is comparable to that of a "hula" hoop, or about 36 inches, with accompanying smaller hoops in lesser quantities per set with diameters of about 24 inches and 12 inches.

Metric equivalents of the three above hoop diameter are about 90, 60, and 30 cms respectively. Straight tubes 50 should be available in varied lengths from several inches up to about 6 feet, or about 5.0 cms to about 2 mts. Wall thickness of tubular member material should be about 3/32 inches, or about 2.0 mms. Tubular members are of resilient plastic, and could be made available in varied colors. Tubes should be supplied in various standard lengths with end pre-slotted, but tubes could be readily cut to desired length and slotted by users with a small hand saw.

Figure 6:
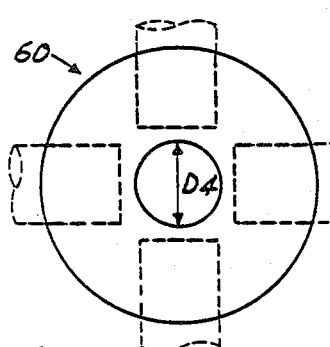
FIG. 6 is a plan view of wheel hub showing axle hole, spoke holes, and partial phantom view of tube spokes.
Figure 6A:
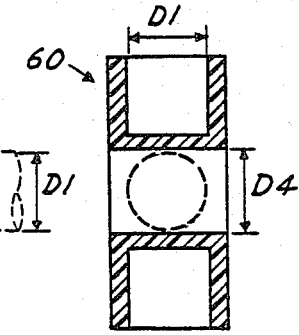
FIG. 6A is a diametric section view through centers of two opposing spoke holes and longitudinal axis of hub in FIG. 6.
Figure 7:
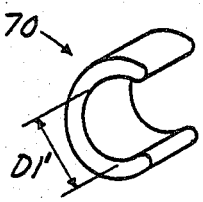
FIG. 7 is a perspective view of a wheel hub nut.

FIG. 6 shows a plan view of wheel hub disc 60 with four spoke holes having diameters of D1 to match outside diameter of tube ends. Shown also is a central axle hole through hub disc 60 having a diameter of D4 which is slightly more than tube 50 outside diameter D1 in order to have axle hole receive a tube as an axle and have hub disc free to rotate around tube. FIG. 6A is a diametric section view of hub disc 60 taken through centers of two opposing spoke holes and the longitudinal axis of hub disc 60. FIG. 7 shows a hub disc nut which is a single clutch element with cylindrical opening diameter D1' which is slightly less than that of outside diameter D1 of tube so as disc nut 70 is able to grasp and frictionally hold a tube 50 in a wheel hub assembly and restrict lateral movement of hub disc on tube. Clutch/plug connector 10 or 11 can be used in place of hub nut 70 if so desired. Most suitable material for construction of wheel hub disc 60 and hub disc nut 70 is resilient plastic.

Figure 8:
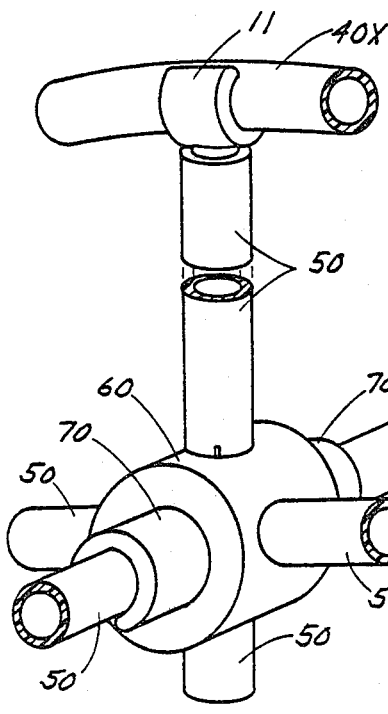
FIG. 8 is a generalized perspective view showing examples of various whole and partial construction elements and manner in which they are used in assembly.
Figure 8:
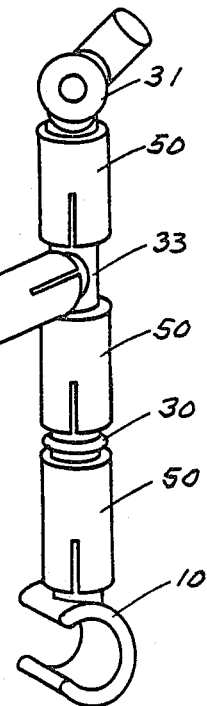

FIG. 8 is an abstract generalized perspective view showing examples of various whole and partial construction set elements and manner in which they are used in assembly. Due to space limitations, the large diameter hoop in wheel assembly is in partial view only and is represented by designation 40X. Cut views of spoke tubes 50 are also shown.

Before proceeding to schematic construction set assembly examples shown in FIGS. 9 through 12, it is necessary to be familiar with Table 1 detailing reference items used therein. Capital letters and reference signs are both used to denote various construction elements, analogous to letters and signs used to denote electrical components in various schematic electrical circuits. Use of such letters and signs for assemblies allows relatively large and complex structures to be reasonably depicted using minimal effort and space. Details of Table 1 are self-explanatory and should be readily understood as to how they relate to schematic structural examples.

Figure 9:
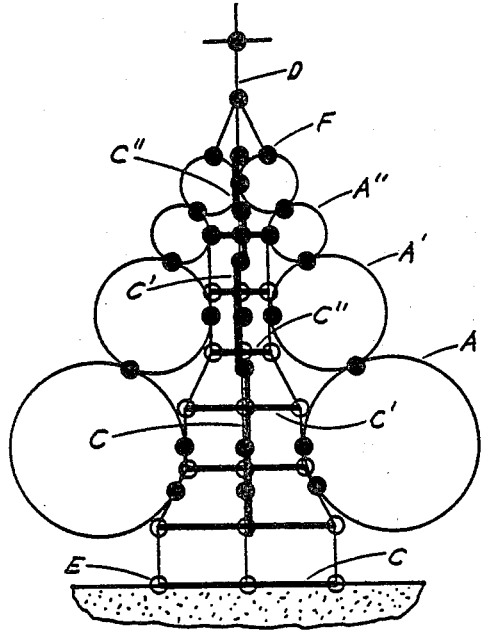
FIG. 9 is a schematic elevation view of an assembly of a christmas tree.

FIG. 9 is a schematic elevation view of a symmetrical christmas tree having large diameter hoops at base of tree and small hoops near top of tree, with intermediate size hoops in center. Hoops and tubes as shown in schematic are roughly proportional to actual sizes used, with hoops viewed in line with their plane shown as thick straight lines, and hoops viewed perpendicular to their plane shown as thin line circles. Tubes are shown as thin straight lines when viewed perpendicular to their plane. Hoops in horizontal plane in lower portion of tree are spaced approximately 12 inches (30 cms) apart and tied together with a combination of tubular member-to-tube end connectors type 10 and short tube lengths, with connectors shown schematically as small blank circles. Tree height is about 10 feet (3 mts), with cross at top being formed by tubes and a tubular member-to-tubular member connector type 22 shown schematically as a small black circle. Many other type 22 connectors are used in assembly, with possible optional use of types 20 and 21 in many places. No multi-plug connectors or wheel hubs are used in this example. A quantity count of elements and materials used in tree structure is: 36 in. (90 cms) hoops: 6; 24 in. (60 cms) hoops: 6; 12 in. (30 cms) hoops: 11; 12 in. (30 cms) tubes: 21; 24 in. (60 cms) tubes: 4; 36 in. (90 cms) tubes: 1; type 22 double clutch connectors: 35; clutch/plug connectors: 44. Optional methods of forming some connections may change quantity count. Since tree is quite tall, assembly will require use of sub-assemblies, probably three, with completed portion of tree being raised and next portion being placed beneath it and then connecting the two. Cross bracing might be needed in lower central portion of tree for added stability. Use long tubes and double clutch connectors if necessary. Total weight of tree structure is estimated at about 12 pds. (5.5 Kgs).

Figure 10:
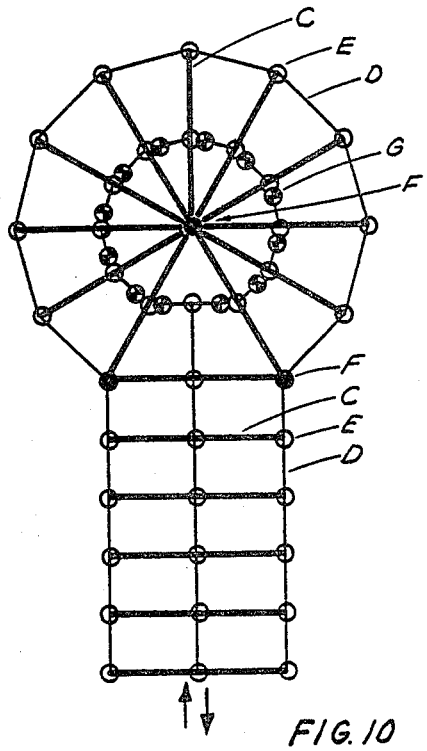
FIG. 10 is a schematic plan or top view of an assembly of a circle house with tunnel entrance.

FIG. 10 is a schematic plan or top view of a circle house with tunnel entrance, using 17–36 in. (90 cms) hoops, all standing in vertical planes, tied together with various connectors and tubes. At center point area of circle house, 11 type 21 connectors are used to tie together all pairs of abutting hoops. Pads and narrow carpets can be placed inside on structure floor to allow children to comfortably crawl through structure. Cover cloths can be placed on top of structure for added effect.

Figure 11:
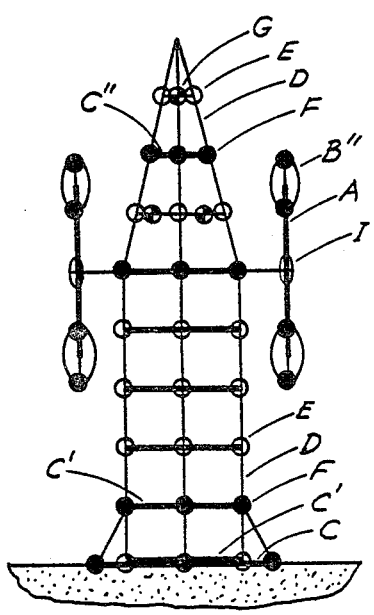
FIG. 11 is a schematic side elevation view of an assembly of a windmill.
Figure 12:
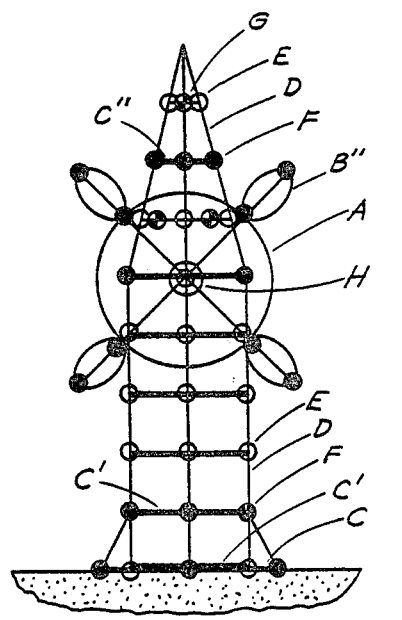
FIG. 12 is a schematic front elevation view of windmill of FIG. 11.

FIGS. 11 and 12 show schematic side and front elevation views respectively, of a windmill. This structure shows how wheel hub assemblies are used to make windmill mobile. Paper sheets can be affixed flat on paddle blades formed by hoops set at a diagonal to actually make windmill functional when set-up outdoors with gentle wind blowing. One tube, about 60 in. (1.5 mts) long is used to act as an axle for both wheel hubs forming windmill paddles. Cross-bracing might be added to lower portion of structure for added stability.

The list of structures that can be assembled with subject construction set is extensive. A few suggested complex structures for group participation efforts are: rocket-ship, dinosaur skeleton, train, paddle wheel boat, tricycle, water wheel, automobile, bridges, buildings, abstract structures, etc. Simple structures such as tables, chairs, double hub wheels, letters and numbers, etc. can also be made by individuals. Booklet accompanying construction set could detail all suggested assembly structures with photos, schematics, quantity counts of elements and materials, assembly methods, etc. Some structures could be made for permanent use for displays, as models, etc. If permanent structure is desired, connectors and tubular members could be drilled and reinforced at tie points with self-tapping screws.

The invention may be embodied in other specific forms without departing from the spirit or essential attributes thereof and, accordingly, references should be made to the attached claims, rather than to the foregoing description as indicating the scope of the invention.

TABLE 1

Reference Signs Used for Schematic Examples of Construction Set Assemblies

| Key | Reference Signs | Construction Element & Notes | Element Reference No. | Added Notes |
|---|---|---|---|---|
| A | (Large circle) | Hoop - viewed perpendicular to its plane | 40 | Footnotes 1 & 2 |
| B | (Large ellipse) | Hoop - viewed in diagonal | 40 | |
| C | ——— | Hoop - viewed in its plane | 40 | |
| D | | Tubing | 50 | Footnote 2 |
| E | ○ | Clutch/plug connector-1 or 2 | 10, 11 | Use best types of |
| F | ⊕ | Double clutch connector - any quantity in one area | 20, 21, 22 | plug and clutch connectors in assemblies. |
| G | ⊕ | Multi-plug connector-1 or 2 | 30 to 37 inclusive | |

TABLE 1-continued

Reference Signs Used for Schematic Examples of Construction Set Assemblies

| Key | Reference Signs | Construction Element & Notes | Element Reference No. | Added Notes |
|---|---|---|---|---|
| H | | Wheel Hub/Nut Assembly - viewed from front | 60, 70 (10 or 11 can be used as 70) | Four spoke wheel uses one hub; |
| I | | Wheel Hub/Nut Assembly - viewed in its plane | 60, 70 (10 or 11 can be used as 70) | eight spoke wheel uses two hubs. |

Footnotes:
1 Schematic key letters (A,B,C), A', B', C'), and A", B", C") are used in assemblies to indicate large, medium, and small size hoops respectively.
2 Lengths of lines and sizes of circles and ellipses in schematics are roughly proportional to actual measurements of construction elements.

I claim:
1. Group use toy structural construction set comprising:
   a. straight tubes, each having a tubular member body of resilient plastic, each of said tubes having at each end portion at least one saw-cut type slot through its wall parallel to the longitudinal axis thereof;
   b. circular hoops, each having a tubular member body of resilient plastic, with the outside diameter of said tubular member body of said hoops being the same as that of said tubular member body of said tubes;
   c. tubular member body-to-tube end connector means including C-shaped means for releasable external engagement with the tubular member body of one of said tubes or of one of said hoops and insertable means for releasable internal engagement with an end of one of said tubes;
   d. tubular member body-to-tubular member body connector means including two C-shaped means for releasable external interengagement of said tubular member bodies of two of said tubes, two of said hoops, or one of said tubes and one of said hoops;
   e. tube end-to-tube end connector means including at least two insertable means for releasable internal interengagement of of ends of a plurality of said tubes, with said interengagement occurring at a common junction point;
   f. a wheel hub block having a plurality of equally spaced spoke holes disposed radially around the periphery of said hub block and with the axes of said spoke holes being in a common plane, said spoke holes having a depth and diameter sufficient to receive and frictionally hold said slotted ends of said tubes, said hub block also having an axle hole passing through its center and normal to said plane of said axes of said spoke holes, the diameter of said axle hole being slightly more than the outside diameter of said tubes, whereby said axle hole can pass one of said tubes as an axle so as to permit said hub block to be free to revolve around one of said tubes.

2. The set of claim 1 wherein said tubular member body-to-tube end connector means comprises a resiliently openable C-shaped clutching element and an abutting circular cross-sectional tapered plug, said clutching element having a pair of claws defining a substantially cylindrical opening therebetween and having outer end portions so spaced to define a restricted passageway communicating with said cylindrical opening, said cylindrical opening having a diameter slightly less than the outside diameter of said tubular member bodies of said tubes and said hoops, said restricted passageway having a width slightly less than said diameter of said cylindrical opening, said pair of claws being so curved and so sized to permit them to grasp and frictionally hold a tubular member of one of said tubes or one of said hoops, said plug having where its body portion abuts said clutching element a diameter slightly more than the inside diameter of said tubular member body of said tubes, and the tapered body of said plug diminishing to a diameter at its end which is same as that of said inside diameter of said tubular member body of said tubes, said plug having a body so tapered and sized to permit it to be fitted into and frictionally held in one of said slotted ends of said tubes, with the longitudinal axis of said cylindrical opening and the longitudinal axis of said plug being in same plane and normal.

3. The set of claim 1 wherein said tubular member body-to-tubular member body connector means comprises a pivotal unit having two identical, separate, and abutting resiliently openable C-shaped clutching elements, each of said clutching elements having a pair of claws defining a substantially cylindrical opening therebetween and having outer end portions so spaced to define a restricted passageway communicating with said cylindrical opening, said cylindrical opening having a diameter slightly less than the outside diameter of said tubular member bodies of said tubes and said hoops, said restricted passageway having a width slightly less than said diameter of said cylindrical opening, each of said clutching elements having a flat abutting surface parallel to a plane passing through the longitudinal axis of said cylindrical opening and the longitudinal center line of said restricted passageway, two of said clutching elements being fastened together by a single fastener passing through appropriate apertures in the bodies of said two clutching elements, the longitudinal axis of said fastener being normal to said flat abutting surfaces of said clutching elements, and the longitudinal axis of said fastener also passing through the geometric volume center point of said cylindrical opening of each of the two said clutching elements, each of the two pairs of claws of said pivoted unit being so curved, sized, and positioned to permit the two said pairs of claws to grasp and frictionally hold jointly said tubular member bodies of two of said tubes, two of said hoops, or one of said tubes and one of said hoops.

4. The set of claim 1 wherein said tube end-to-tube end connector means comprises a pivotal unit having two identical, separate, and abutting half units, each of said half units having a circular cross-sectional tapered plug with an integrally attached disc lug, said plug having where its body portion abuts said disc lug a diameter slightly more than the inside diameter of said tubular member body of said tubes, and the tapered body of said plug diminishing to a diameter at its end which is same as that of said inside diameter of said tubular member body of said tubes, said disc lug having a diameter slightly more than the end diameter of said plug, and said disc lug having a thickness about one-half that of said end diameter of said plug, said disc lug being integrally attached to said plug and having a flat surface with the plane and center point of one flat surface of said disc lug in line with the longitudinal axis of said plug, two of said half units being pivotally fastened together by a single fastener passing normal through appropriate apertures in centers of said flat surfaces of said disc lugs, with said pivotal unit so formed to have the longitudinal axes of said plugs of said half units intersect at the center point of said fastener independent of the angular alignment of said plugs.

5. The set of claim 1 wherein at least some of said tubular member body-to-tubular member body connector means comprise an integral unit having two identical and abutting resiliently openable C-shaped clutching elements, each of said clutching elements having a pair of claws defining a substantially cylindrical opening therebetween and having outer end portions so spaced to define a restricted passageway communicating with said cylindrical opening, said cylindrical opening having a diameter slightly less than the outside diameter of said tubular member bodies of said tubes and said hoops, said restricted passageway having a width slightly less than said diameter of said cylindrical opening, the two said clutching elements of said integral unit being in close proximity, with the longitudinal axis of said cylindrical opening and the longitudinal center line of said restricted passageway being in the same plane for each of the said clutching elements, with said plane of each of the two said clutching elements being parallel to each other and normal to a center line passing through the geometric volume center points of said cylindrical openings.

6. The set of claim 1 wherein at least some of said tube end-to-tube end connector means comprise a family of fixed multi-plug types, each of said multi-plug types having a plurality of systematically spaced circular cross-sectional tapered plugs, all of said plugs of any of said multiplug types being attached together at a common junction point with said plugs orientated radially outwardly, the diameter of each of said plug next to common junction point being slightly more than the inside diameter of said tubular member body of said tubes, and the tapered body of said plug diminishing to a diameter at its end which is same as that of said inside diameter of said tubular member body of said tubes, the number of said plugs for each of the various multi-plug types of said family ranging from two to six inclusive, with said plugs having various systematic 90° and 180° angular spacing therebetween to form said multi-plug types including a "straight run" type having two said plugs, an "ell" type having two said plugs, a "tee" type having three said plugs, an "ell with lateral" type having three said plugs, a "cross" type having four said plugs, a "cross with lateral" type having five said plugs, and a "cross with two laterals" type having six said plugs.

* * * * *